United States Patent
Tobergte (10) Patent No.: US 8,172,493 B2
(45) Date of Patent: May 8, 2012

(54) APPARATUS AND METHOD FOR TRANSPORTING AND ALIGNING WIND TURBINE ROTOR BLADE

(75) Inventor: Nicholas Joseph Tobergte, Greenville, SC (US)

(73) Assignee: General Electric Company, Schenectady, NY (US)

( * ) Notice: Subject to any disclaimer, the term of this patent is extended or adjusted under 35 U.S.C. 154(b) by 275 days.

(21) Appl. No.: 12/435,132

(22) Filed: May 4, 2009

(65) Prior Publication Data

US 2010/0143062 A1   Jun. 10, 2010

(51) Int. Cl.
*B60P 3/40* (2006.01)
(52) U.S. Cl. .............................. 410/44; 410/120; 33/286
(58) Field of Classification Search ................... 410/120, 410/44, 45, 34, 53; 33/286, 412, 529
See application file for complete search history.

(56) References Cited

U.S. PATENT DOCUMENTS

| | | | |
|---|---|---|---|
| 6,320,273 B1* | 11/2001 | Nemec | 290/55 |
| 6,364,609 B1* | 4/2002 | Barnes | 416/142 |
| 7,334,989 B2 | 2/2008 | Arelt | |
| 2005/0031431 A1* | 2/2005 | Wobben | 410/45 |
| 2006/0251517 A1 | 11/2006 | Grabau | |
| 2007/0248431 A1* | 10/2007 | Jensen | 410/45 |
| 2009/0066090 A1* | 3/2009 | Boone | 290/55 |
| 2009/0169323 A1* | 7/2009 | Livingston | 410/120 |
| 2010/0158694 A1* | 6/2010 | Stam et al. | 416/230 |

FOREIGN PATENT DOCUMENTS

| | | |
|---|---|---|
| EP | 1584817 A1 | 7/2004 |
| WO | 03057528 A1 | 7/2003 |
| WO | 03076307 A1 | 9/2003 |
| WO | 2006002621 A1 | 1/2006 |
| WO | 2007147413 A1 | 12/2007 |

* cited by examiner

Primary Examiner — Toan To
(74) Attorney, Agent, or Firm — James McGinness, Esq.; Armstrong Teasdale LLP (57) ABSTRACT

An apparatus and method to facilitate transporting and aligning a multiple piece wind turbine rotor blade including a root piece and a tip piece. The apparatus includes a first portion configured to support a first end portion of the root piece and a second portion pivotally coupled to the first portion. The second portion is configured to support a first end portion of the tip piece.

19 Claims, 7 Drawing Sheets

APPARATUS AND METHOD FOR TRANSPORTING AND ALIGNING WIND TURBINE ROTOR BLADE

BACKGROUND OF THE INVENTION

The subject matter described herein relates generally to wind turbine blades and, more particularly, to transporting two piece wind turbine blades to a wind farm site and assembling the wind turbine blades at the wind farm site.

Many conventional wind turbine generators include a plurality of single piece or unitary rotor blades that may have a length of about 30 meters (m) to about 47 m or more. Transporting the single piece rotor blades to a wind farm site has become increasingly difficult, particularly over rough terrain or through narrow passageways, as the length of these single piece rotor blades increases.

As a result, two piece rotor blades are being made that are easier to transport than the conventional single piece rotor blades. Further, the two piece rotor blades when assembled may exceed the length of conventional one piece blades.

Once transported to the wind farm site, the two piece rotor blades are assembled and coupled to the rotor hub of the wind turbine generator. One approach for assembling the two piece rotor blades includes coupling a small base or root piece to the wind turbine hub and then coupling a larger tip piece to the root piece. A second approach includes coupling the two pieces together on the ground and then coupling the assembled rotor blades to the rotor hub using a suitable crane or hoisting apparatus.

However, using either of the two approaches described, the two pieces of the rotor blade are difficult to align while assembling the pieces together and coupling the assembled rotor blade to the rotor hub requires multiple crane operations to complete, which may be undesirable.

It is desirable to provide an apparatus and method that facilitates easy transportation of a two piece rotor blade to a wind farm site and/or easy alignment of the two pieces while assembling the rotor blade at the wind farm site.

BRIEF DESCRIPTION OF THE INVENTION

In one aspect, an apparatus is provided to facilitate transporting and aligning a two piece wind turbine rotor blade including a root piece and a tip piece. The apparatus includes a first portion configured to support a first end portion of the root piece. A second portion is pivotally coupled to the first portion, and configured to support a first end portion of the tip piece.

In another aspect, a method is provided for transporting and aligning a two piece wind turbine rotor blade having a root piece and a tip piece. The method includes supporting a first end of the root piece within a first portion of an apparatus and supporting a first end of the tip piece within a second portion of the apparatus pivotally coupled to the first portion. The tip piece is aligned with the root piece.

In another aspect, a method is provided for transporting a two piece wind turbine rotor blade having a root piece and a tip piece. The method includes supporting a first end of the root piece within a first portion of an apparatus and supporting a first end of the tip piece within a second portion of the apparatus pivotally coupled to the first portion. The second portion is positioned with respect to the first portion in a transport configuration to facilitate transporting the rotor blade. The rotor blade is transported to a desired location, such as a wind turbine installation site.

DETAILED DESCRIPTION OF THE INVENTION

The embodiments described herein relate to an apparatus and a method for transporting a multiple piece rotor blade for a wind turbine and aligning and coupling the rotor blade pieces at a wind turbine installation site, such as at a wind farm. In one embodiment, a reusable apparatus is supported by a suitable platform, such as a flat bed trailer. The apparatus includes a first portion configured to support and/or retain an end of a first or root piece of the rotor blade and a second portion movably coupled to the first portion and configured to support and/or retain a cooperating end of a second or tip piece of the rotor blade. The second portion of the apparatus is pivotally movable with respect to the first portion to facilitate alignment of the cooperating ends of the rotor blade. The apparatus provides a stable support structure to facilitate coupling the two pieces together at the wind turbine installation site. In a further embodiment, a third portion of the apparatus facilitates adjusting a height of a portion, such as a blade tip end, of the second piece with respect to a ground plane. For example, in one embodiment, the third portion includes a height adjustable blade tip support structure that supports a blade tip end of the second piece as the second piece is swung or pivotally moved with respect to the first piece to align the second piece with the first piece of the rotor blade. The third portion further facilitates proper alignment of the second piece with the first piece in a direction along an x-axis, a direction along a y-axis, and a direction along a z-axis defined with respect to a centerline of the rotor blade.

Figure 1:
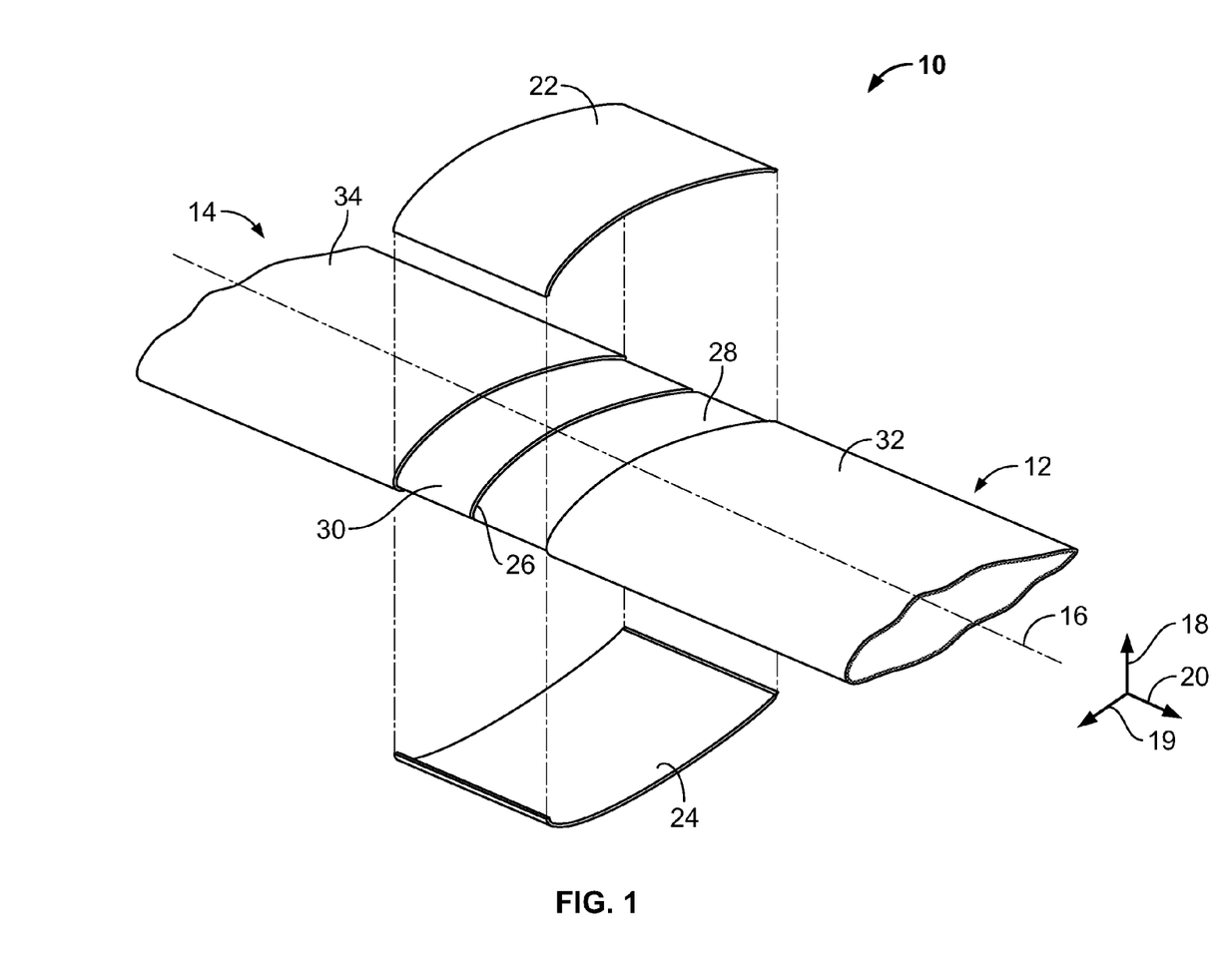
FIG. 1 is perspective view of a portion of a two piece rotor blade.

Referring to FIG. 1, a two piece rotor blade 10 includes a first piece 12, such as a base or root piece, that is configured to couple to a rotor hub of the wind turbine and a second piece 14, such as a tip piece that is configured to couple to first piece 12. First piece 12 and second piece 14 are arranged and aligned with respect to a centerline 16 of rotor blade 10. More specifically, second piece 14 is properly aligned with first piece 12 in a direction along an x-axis 18, a direction along a y-axis 19, and a direction along a z-axis 20 defined with respect to centerline 16 and shown in FIG. 1.

A first connecting element 22 and a cooperating second connecting element 24 bridge a partition line 26 between first piece 12 and second piece 14. In a coupled configuration, first connecting element 22 and second connecting element 24 are positioned within a recess 28 of first piece 12 and a recess 30 of second piece 14. As shown in FIG. 1, recess 28 is formed by a diminution of an end of first piece 12 at partition line 26 and recess 30 is formed by a diminution of an end of second piece 14 at partition line 26. In the embodiment shown in FIG. 1, recesses 28 and 30 are defined to surround centerline 16 of rotor blade 10. Connecting element 22 and connecting element 24 have suitable dimensions to match dimensions of recesses 28 and 30 such that connecting elements 22 and 24, when in flush alignment with a respective outer delimitation surface 32 of first piece 12 and an outer delimitation surface 34 of second piece 14, still leave a hollow space between the outer delimitation surfaces of recess 28 and recess 30 and the inner delimitation surfaces of connecting element 22 and connecting element 24.

For assembly of rotor blade 10, connecting element 22 and connecting element 24 are brought into a desired flush alignment with first piece 12 and second piece 14. Then, the hollow space formed between the outer delimitation surfaces of recesses 28 and 30 and the inner delimitation surfaces of connecting elements 22 and 24 is flooded with an adhesive, which is subsequently hardened.

The embodiment as described above with reference to FIG. 1 is one suitable approach for coupling rotor blade pieces to assemble a multiple piece rotor blade. It should be apparent to those skilled in the art that other suitable coupling or attachment mechanisms and methods may be incorporated to facilitate coupling the rotor blade pieces. For example, rotor blade pieces may be coupled together using suitable mechanical fasteners, such as bolts and/or screws. Regardless of the mechanisms and methods used to couple rotor blade pieces together, the apparatus and method as described below facilitate transporting a multiple piece wind turbine blade to a wind turbine installation site, as well as provide a suitable support structure and alignment mechanism to facilitate coupling the rotor blade pieces together at the wind turbine installation site to minimize a number of crane operations needed to assemble the wind turbine.

Figure 2:
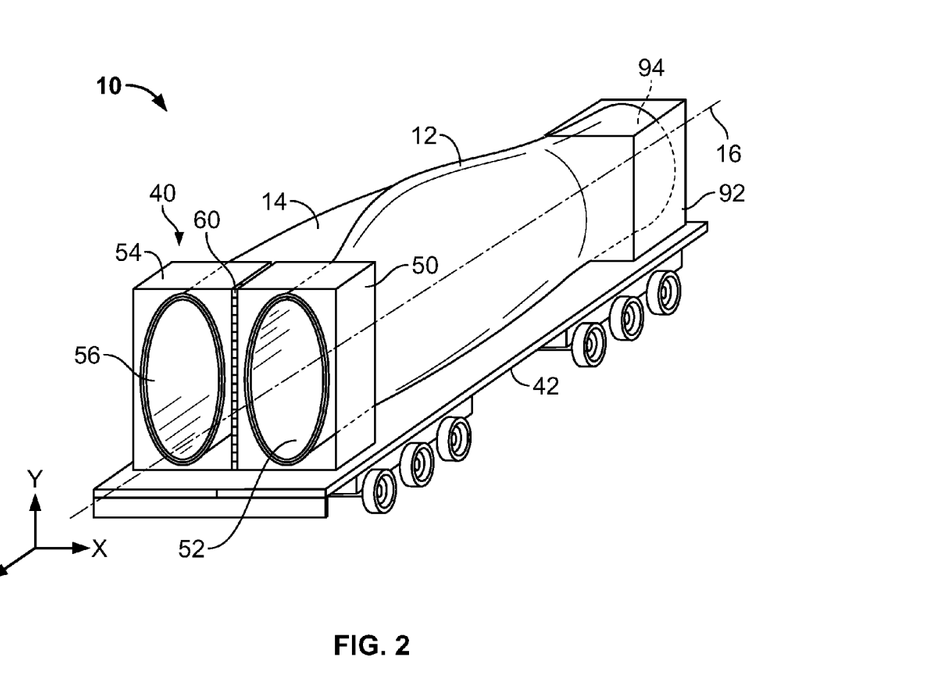
FIG. 2 is a perspective view of an apparatus that facilitates transporting a two piece rotor blade and aligning the rotor blade pieces to assemble the two piece rotor blade.
Figure 3:
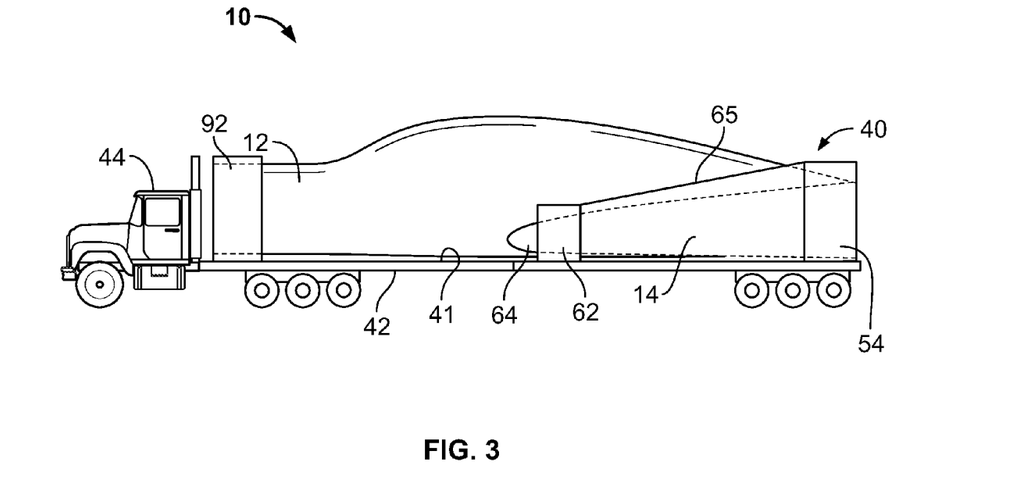
FIG. 3 is a side view of the apparatus shown in FIG. 2 in a transport configuration.
Figure 4:
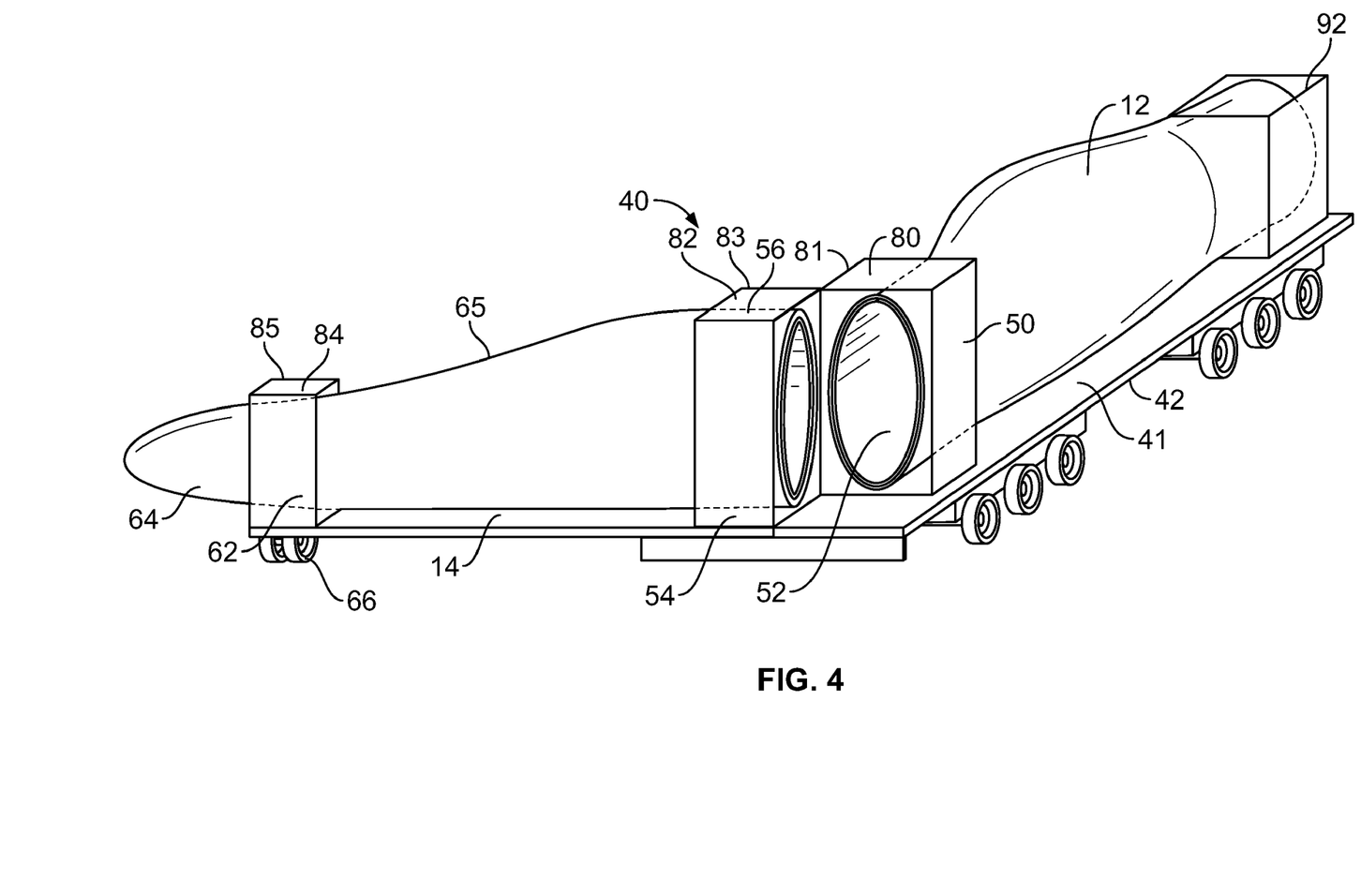
FIG. 4 is a perspective view of the apparatus shown in FIG. 2 in an intermediate configuration during assembly of the two piece rotor blade.
Figure 5:
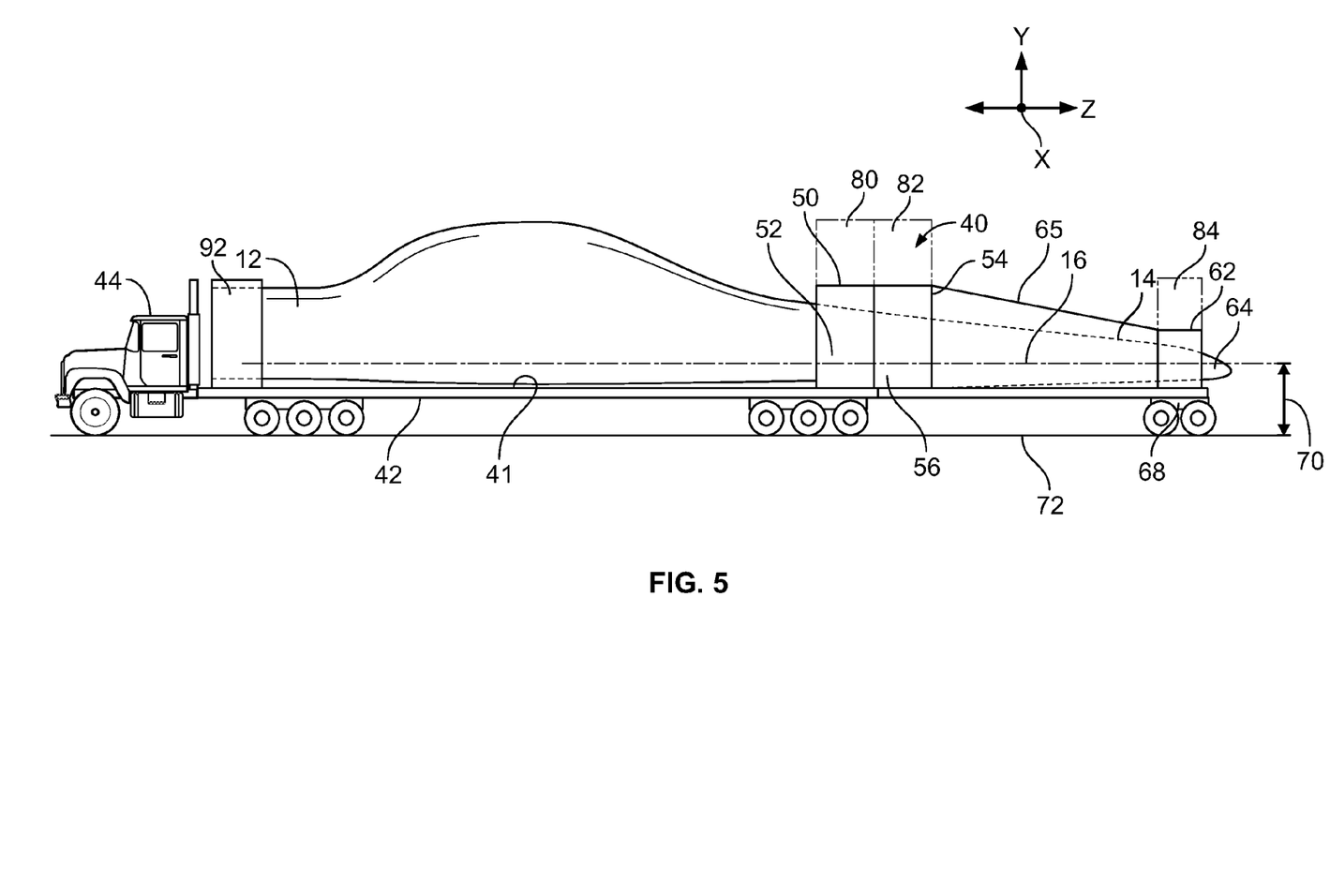
FIG. 5 is a side view of the apparatus shown in FIG. 2 in an alignment configuration to facilitate assembling the two piece rotor blade.
Figure 6:
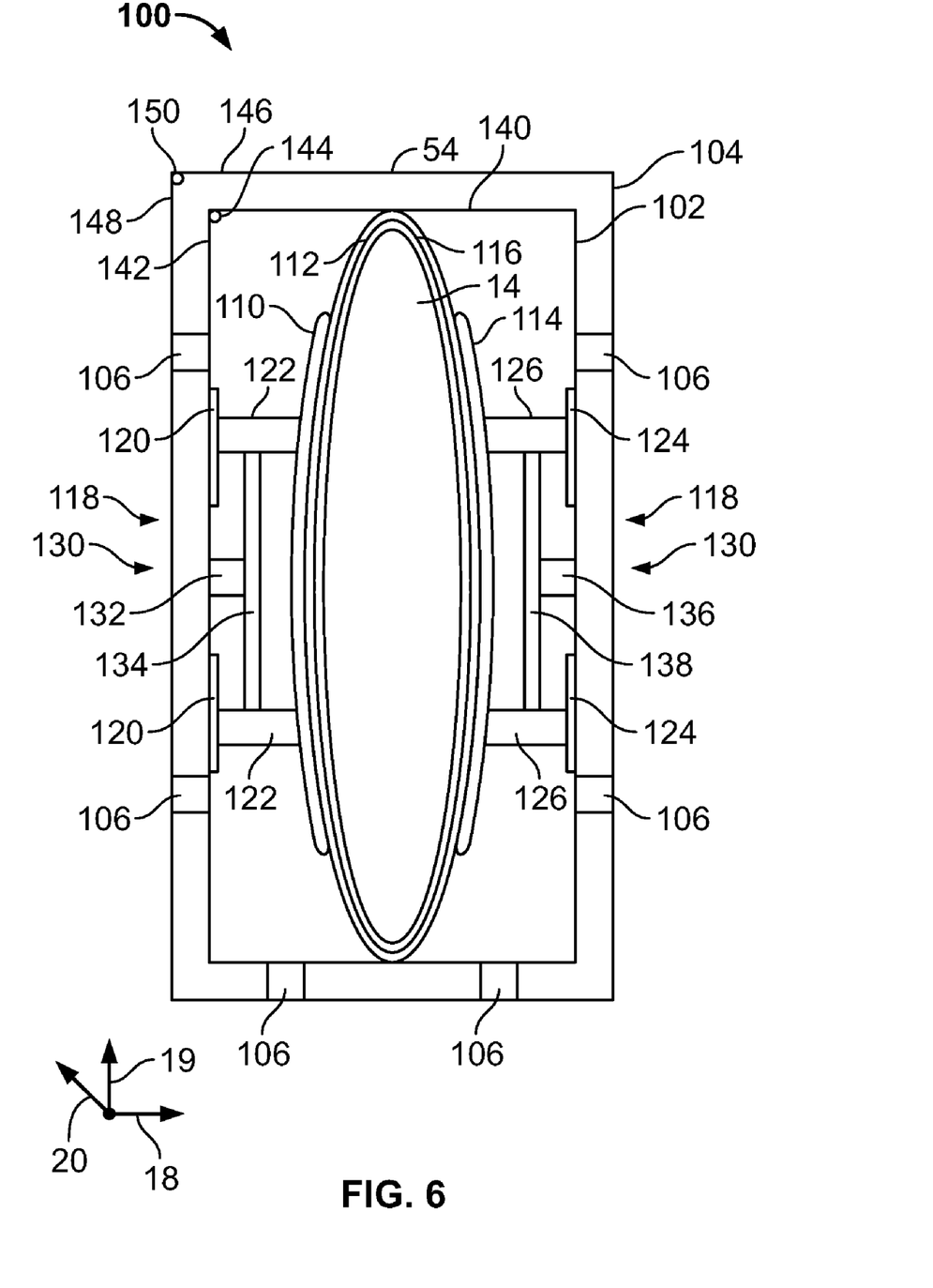
FIG. 6 is a front plan view of a second portion of the apparatus shown in FIG. 2 including an alignment system.

Referring to FIGS. 2-6, an apparatus 40 is configured to facilitate transporting pieces of a multiple piece rotor blade to a desired location, such as a wind turbine installation site, and aligning the pieces to assemble rotor blade 10 on site. In one embodiment as shown in FIGS. 2-6, apparatus 40 is configured to facilitate transporting and assembling two piece rotor blade 10 including first or root piece 12 and second or tip piece 14 of rotor blade 10. FIG. 2 is a perspective view of apparatus 40 and FIG. 3 is a side view of apparatus 40 in a transport configuration to facilitate transporting rotor blade 10 to the desired location. FIG. 4 is a perspective view of apparatus 40 in an intermediate configuration between the transport configuration and an alignment configuration during assembly of rotor blade 10. FIG. 5 is a side view of apparatus 40 in the alignment configuration to facilitate assembling rotor blade 10. FIG. 6 is a front plan view of a second portion of apparatus 40 including an alignment system.

In the embodiment shown in FIGS. 2-6, apparatus 40 is mounted on and/or coupled to a suitable support surface or platform 41, such as a flat bed trailer 42 that is coupled to a truck cab 44, shown in FIG. 3, to transport rotor blade 10 to the desired location. In certain embodiments, apparatus 40 is mounted on and/or coupled to platform 41, which is loaded onto a suitable surface or platform of a transport vehicle for transporting rotor blade 10 to the desired location. Although apparatus 40 is shown in FIGS. 3-5 as mounted on flat bed trailer 42, other forms or modes of transportation may be used to transport rotor blade 10 to the desired location.

Apparatus 40 includes a first portion 50 configured to support and retain an end portion 52 of first piece 12. A second portion 54 of apparatus 40 is movably coupled, such as pivotally coupled, to first portion 50 and configured to support and retain an end portion 56 of second piece 14. In one embodiment, a hinge 60 pivotally couples second portion 54 to first portion 50 to facilitate pivotal movement of second portion 54 with respect to first portion 50. More specifically, in one embodiment, second portion 54 is movable with respect to first portion 50 between a first or transport position to facilitate transporting rotor blade 10 and a second or alignment position to facilitate aligning and coupling second piece 14 to first piece 12 to assemble rotor blade 10.

Referring further to FIGS. 3-5, in one embodiment, apparatus 40 includes in a third or tip support portion 62 configured to support a second or tip end portion 64 of second piece 14 opposing first end portion 56. With second portion 54 pivotally coupled to first portion 50 in the alignment configuration shown in FIG. 5, for example, third portion 62 is movable with respect to second portion 54 to facilitate aligning second piece 14 with first piece 12. With second piece 14 properly aligned with first piece 12 in the x-axis direction, the y-axis direction, and the z-axis direction defined with respect to centerline 16, second piece 14 is coupled or attached to first piece 12 to assemble rotor blade 10. In one embodiment, third portion 62 is coupled to second portion 54 with a suitable support member, such as a rigid member 65 shown in FIGS. 3-5, to facilitate moving third portion 62 with second portion 54 as second portion 54 is pivotally moved with respect to first portion 50 and preventing or limiting misalignment of third portion 62 with second portion 54 during such movement.

In one embodiment, third portion 62 includes a mechanism, such as retractable roller mechanism 66, as shown in FIG. 4, configured to facilitate moving third portion 62 with respect to second portion 54. Roller mechanism 66 includes an adjustment mechanism 68, shown in FIG. 5, configured to adjust a height 70 of second end portion 64 of second piece 14 with respect to a ground plane 72 to facilitate aligning second piece 14 with first piece 12 in the y-axis direction. Further, adjustment mechanism 68 is configured to provide a rotational adjustment, for example with flat bed trailer 42 and/or apparatus 40 positioned on an uneven ground plane 72, to align second piece 14 with first piece 12 in the x-axis direction, the y-axis direction, and the z-axis direction. Adjustment mechanism 68 provides for a rotational adjustment or twist adjustment to compensate for an unevenness of ground plane 72. In a particular embodiment, adjustment mechanism 68 allows a freedom of movement to twist or rotate second piece 14 with respect to first piece 12 to facilitate aligning second piece 14 with first piece 12 in the x-axis direction, the y-axis direction, and the z-axis direction. In a further embodiment, first portion 50 and/or second portion 54 includes a suitable mechanism, such as a retractable roller mechanism and/or a suitable adjustment mechanism to facilitate aligning second piece 14 with first piece 12 in the x-axis direction, the y-axis direction, and the z-axis direction.

In one embodiment, first portion 50 and second portion 54 include at least one section or wall that is movable between a closed position in the transport configuration and an open position in the alignment configuration to facilitate removing rotor blade 10 from within apparatus 40 after assembly. For example, as shown in FIG. 4, first portion 50 includes a top wall 80 that is pivotally and/or removably coupled to a side wall 81 of first portion 50 and, similarly, second portion 54 includes a top wall 82 that is pivotally and/or removably coupled to a side wall 83 of second portion 54. With second piece 14 coupled to first piece 12, top wall 80 and top wall 82 are movable to an open position as shown in phantom lines in FIG. 5 or, alternatively, removed to facilitate removing rotor blade 10 from apparatus 40.

In embodiments wherein third portion 62 includes a top wall 84, top wall 84 of third portion 62 is similarly pivotally and/or removably coupled to a side wall 85 of third portion 62 such that, with second piece 14 coupled to first piece 12, top wall 84 is movable to an open position as shown in phantom lines in FIG. 5 or, alternatively, removed to facilitate removing rotor blade 10 from apparatus 40. In an alternative embodiment, first portion 50, second portion 54, and/or third portion 62 form an opening sized to allow removal of rotor blade 10 through the respective openings.

In further embodiments, apparatus 40 may include a fourth portion or root support portion 92 configured to support a second end portion 94 of first piece 12 opposing first end portion 52, as shown in FIG. 2. In one embodiment, fourth portion 92 is securely mounted to platform 41 of flat bed trailer 42 to facilitate properly positioning first piece 12 on flat bed trailer 42 and moving rotor blade 10 between the transport configuration and the alignment configuration.

Referring further to FIG. 6, second portion 54 includes an alignment system 100 to facilitate aligning second piece 14 with first piece 12. Although only second portion 54 is shown as including alignment system 100, in the exemplary embodiment, at least one of first portion 50, second portion 54, third portion 62 and fourth portion 92 of apparatus 40 includes alignment system 100 to facilitate aligning second piece 14 with first piece 12. Alignment system 100 includes an inner support 102 that is movably positionable within an outer support 104. In one embodiment, one or more tracks 106 are positioned between inner support 102 and outer support 104 to facilitate movement of inner support 102 with respect to outer support 104 in a direction along z-axis 20. In a particular embodiment, tracks 106 also facilitate movement of inner support 102 with respect to outer support 104 in a direction along x-axis 18 and/or a direction along y-axis 19.

Alignment system 100 includes a first blade support 110 configured to receive and support a first side 112 of second piece 14 positioned within second portion 54 and a cooperating second blade support 114 configured to receive and support an opposing second side 116 of second piece 14. An x-axis alignment mechanism 118 is operatively coupled to first blade support 110 and configured to position and/or align first blade support 110 at a desired x-axis orientation to facilitate properly positioning second piece 14 with respect to x-axis 18. In one embodiment, x-axis alignment mechanism 118 includes one or more bases 120 coupled to inner support 102 and a corresponding arm 122 movably coupled between corresponding base 120 and first blade support 110 to facilitate moving first blade support 110 in a direction along x-axis 18. Similarly, x-axis alignment mechanism 118 is operatively coupled to second blade support 114 and configured to position and/or align second blade support 114 at a desired x-axis orientation to facilitate properly positioning second piece 14 with respect to x-axis 18. In one embodiment, x-axis alignment mechanism 118 includes one or more bases 124 coupled to inner support 102 and a corresponding arm 126 movably coupled between corresponding base 124 and second blade support 114 to facilitate moving second blade support 114 in a direction along x-axis 18.

A y-axis alignment mechanism 130 is operatively coupled to first blade support 110 and configured to position and/or align first blade support 110 at a desired y-axis orientation to facilitate properly positioning second piece 14 with respect to y-axis 19. In one embodiment, y-axis alignment mechanism 130 includes a base 132 coupled to inner support 102 and a corresponding arm 134 coupled to base 132 and movably coupled between corresponding arms 122 of x-axis alignment mechanism 118 to facilitate moving first blade support 110 in a direction along y-axis 19. Similarly, y-axis alignment mechanism 130 is operatively coupled to second blade support 114 and configured to position and/or align second blade support 114 at a desired y-axis orientation to facilitate properly positioning second piece 14 with respect to y-axis 19. In one embodiment, y-axis alignment mechanism 130 includes a base 136 coupled to inner support 102 and a corresponding arm 138 coupled to base 136 and movably coupled between corresponding arms 126 of x-axis alignment mechanism 118 to facilitate moving second blade support 114 in a direction along y-axis 19.

In one embodiment, inner support 102 includes a top panel 140 pivotally coupled to an adjacent side panel 142 using a suitable coupling component, such as a hinge 144. Top panel 140 is movable between a closed position, as shown in FIG. 6, and an open position to facilitate removing the assembled rotor blade from within apparatus 40, and specifically from within second portion 54. Similarly, outer support 104 includes a top panel 146 pivotally coupled to an adjacent side panel 148 using a suitable coupling component, such as a hinge 150. Top panel 146 is movable with top panel 140 between a closed position, as shown in FIG. 6, and an open position to facilitate removing the assembled rotor blade from within apparatus 40, and specifically from within second portion 54.

Figure 7:
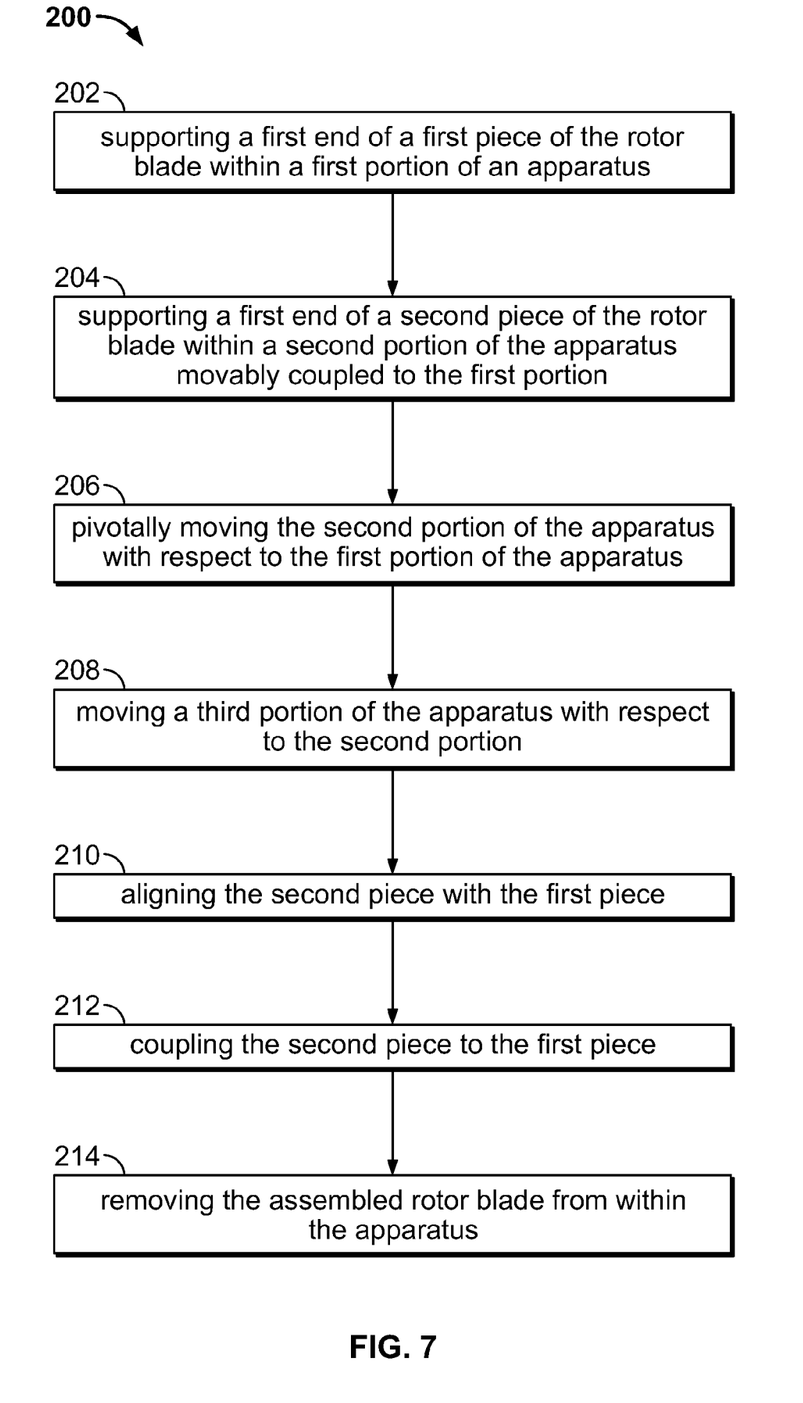
FIG. 7 is a flow diagram illustrating an exemplary method for assembling a two piece rotor blade.

FIG. 7 is a flow diagram illustrating an exemplary method 200 for assembling a wind turbine rotor blade, such as two piece rotor blade 10. In one embodiment, second piece 14 is aligned with first piece 12 of rotor blade 10. In one embodiment, second piece 14 is moved with respect to first piece 12 in at least one of the x-axis direction, the y-axis direction, and the z-axis direction to facilitate aligning second piece 14 with first piece 12.

To facilitate transporting and assembling rotor blade 10, a first end 52 of first piece 12 is supported by and retained within 202 first portion 50 of apparatus 40 and a first end portion 56 of second piece 14 is supported by and retained within 204 second portion 54 of apparatus 40, which is pivotally coupled to first portion 50. In one embodiment, second portion 54 is hingedly coupled to first portion 50 and is pivotally moved 206 with respect to first portion 50 of apparatus 40 to facilitate aligning second piece 14 with first piece 12. As second portion 54 is pivotally moved with respect to first portion 50, third portion 62, supporting second end portion 64, also moves in an arcuate direction with respect to first portion 50 to facilitate aligning and/or coupling second piece 14 to first piece 12. Further, third portion 62 of apparatus 40 is moved 208 with respect to second portion 54 to facilitate aligning second piece 14 with first piece 12, for example with first portion 50 coupled to second portion 54 in the installation configuration.

Third portion 62 is configured to support second end portion 64 of second piece 14 with respect to second portion 54. Third portion 62 includes roller mechanism 66 that is extendable to facilitate moving third portion 62 with respect to second portion 54. A height of second end portion 64 of second piece 14 with respect to a ground plane is adjusted to facilitate aligning second piece 14 with first piece 12 in the y-axis direction. With second piece 14 aligned 210 with first piece 12, second piece 14 is coupled 212 to first piece 12. More specifically, first end portion 56 of second piece 14 is coupled to first end portion 52 of first piece 12.

In a further embodiment, the assembled rotor blade 10 is removed 214 from within apparatus 40. In a particular embodiment, first portion 50, second portion 54, and/or third portion 62 includes a wall, such as a top wall, having one or more panels that are movable to an open position or, alternatively, removed to facilitate removing assembled rotor blade 10 from within apparatus 40. In an alternative embodiment, first portion 50, second portion 54, and/or third portion 62 form an opening at a top end that is sized to allow removal of rotor blade 10 through the respective openings.

Figure 8:
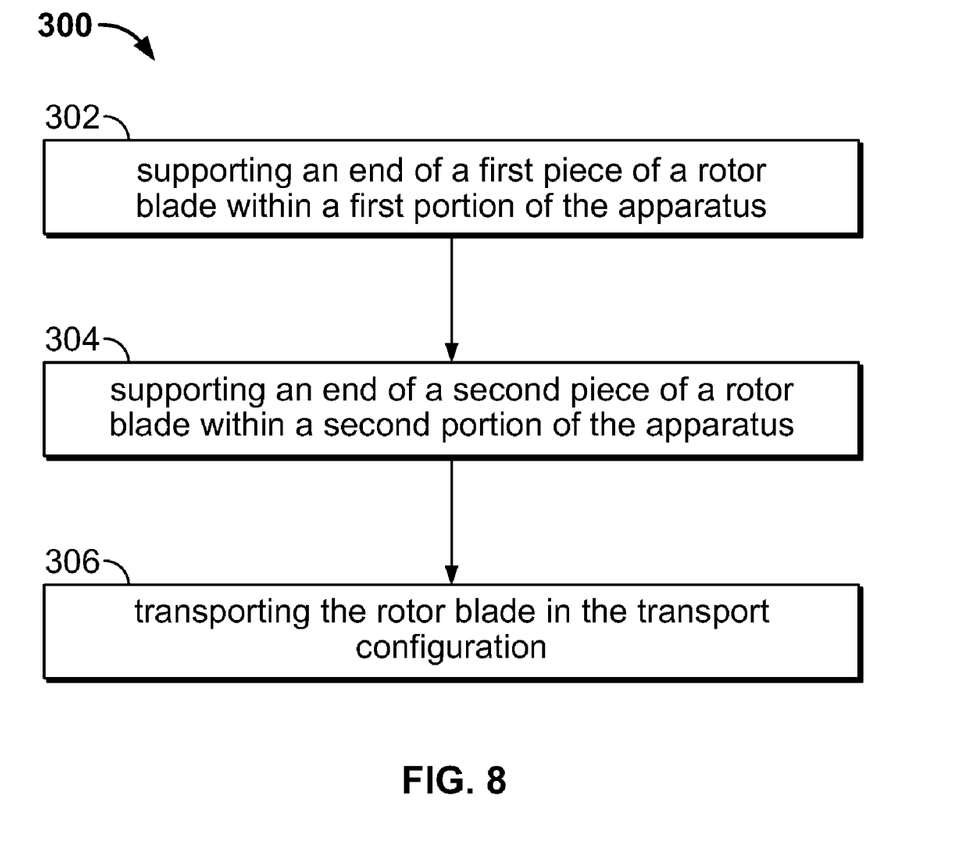
FIG. 8 is a flow diagram illustrating an exemplary method for transporting a two piece rotor blade.

FIG. 8 is a flow diagram illustrating an exemplary method 300 for transporting a wind turbine rotor blade, such as two piece rotor blade 10 having a first or root piece and a second or tip piece. To facilitate transporting rotor blade 10, a first end portion 52 of first piece 12 is supported by and retained within 302 first portion 50 of apparatus 40 and a first end 56 of second piece 14 is supported by and retained within 304 second portion 54 of apparatus 40, which is pivotally coupled to first portion 50. In one embodiment, second portion 54 is hingedly coupled to first portion 50 and is positioned with respect to first portion 50 of apparatus 40 in a transport configuration to facilitate transporting rotor blade 10. With rotor blade 10 in the transport configuration, rotor blade 10 is transported 306 to a desired location, such as the wind turbine installation site.

The above-described apparatus and method provide for easy transportation of a multiple piece wind turbine blade and a support structure and an alignment mechanism to facilitate aligning and coupling the two pieces together at a wind turbine installation site to assemble the rotor blade and minimize a number of crane operations needed to assemble the rotor blade to the wind turbine rotor hub.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus to facilitate transporting and aligning pieces of a wind turbine rotor blade including a first piece and a second piece, said apparatus comprising:
    a first portion configured to support a first end portion of the first piece; and,
    a second portion configured to hingedly couple to said first portion, said second portion configured to support a first end portion of the second piece.

2. An apparatus in accordance with claim 1, wherein said second portion is movable with respect to said first portion to a first position to facilitate transporting the rotor blade.

3. An apparatus in accordance with claim 2, wherein said second portion is movable with respect to said first portion from the first position to a second position to facilitate aligning the second piece with the first piece.

4. An apparatus in accordance with claim 1, further comprising a third portion configured to support a second end portion of the second piece opposing the first end portion of the second piece.

5. An apparatus in accordance with claim 4, wherein said third portion is movable with respect to said second portion to facilitate aligning the second piece with the first piece.

6. An apparatus in accordance with claim 5, wherein said third portion further comprises a mechanism configured to facilitate moving said third portion with respect to said second portion.

7. An apparatus in accordance with claim 4, further comprising an adjustment mechanism configured to adjust a height of the second end portion of the second piece with respect to a ground plane to facilitate aligning the second piece with the first piece.

8. An apparatus in accordance with claim 3, wherein said third portion is coupled to said second portion.

9. An apparatus in accordance with claim 1, further comprising a hinge pivotally coupling said second portion to said first portion.

10. An apparatus in accordance with claim 1, wherein each of said first portion and said second portion comprises a wall movable to an open position to facilitate removing the rotor blade from within said apparatus.

11. An apparatus in accordance with claim 1, wherein at least one of said first portion and said second portion comprises an alignment system configured to receive the first end portion of the wind turbine rotor blade.

12. A method for transporting and aligning pieces of a wind turbine rotor blade having a first piece and a second piece, said method comprising:
    supporting a first end of the first piece within a first portion of an apparatus;
    supporting a first end of the second piece within a second portion of the apparatus, the second portion configured to hingedly couple to the first portion; and,
    aligning the second piece with the first piece.

13. A method in accordance with claim 12, further comprising coupling the first end of the second piece to the first end of the first piece.

14. A method in accordance with claim 12, wherein aligning the second piece with the first piece comprises hingedly moving the second portion of the apparatus with respect to the first portion of the apparatus.

15. A method in accordance with claim 14, further comprising moving a third portion of the apparatus configured to support a second end portion of the second piece with respect to the second portion to facilitate aligning the second piece with the first piece.

16. A method in accordance with claim 15, further comprising extending a mechanism from the third portion to facilitate moving the third portion with respect to the second portion.

17. A method in accordance with claim 15, further comprising adjusting a height of the second end portion of the second piece with respect to a ground plane to facilitate aligning the second piece with the first piece.

18. A method in accordance with claim 12, further comprising moving the second piece with respect to the first piece in at least one of an x-axis direction, a y-axis direction, and a z-axis direction to facilitate aligning the second piece with the first piece.

19. A method for transporting pieces of a wind turbine rotor blade having a first piece and a second piece, said method comprising:
    supporting a first end of the first piece within a first portion of an apparatus;
    supporting a first end of the second piece within a second portion of the apparatus, the second portion configured to hingedly couple to the first portion and positioned with respect to the first portion in a transport configuration to facilitate transporting the rotor blade; and,
    transporting the rotor blade to a desired location.

* * * * *